United States Patent
Daoud (10) Patent No.: US 6,247,964 B1
(45) Date of Patent: Jun. 19, 2001

(54) WIRE CONNECTOR BLOCKS FOR MOUNTING ONTO MOUNTING SURFACES OF VARIABLE THICKNESSES

(75) Inventor: Bassel Hage Daoud, Parsippany, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/391,015

(22) Filed: Sep. 7, 1999

(51) Int. Cl.$^7$ .............................. H01R 13/73; H02B 1/01
(52) U.S. Cl. ............................................. 439/545; 439/564
(58) Field of Search .................................... 439/564, 557, 439/545, 573, 532, 409, 676

(56) References Cited

U.S. PATENT DOCUMENTS 5,993,264 * 11/1999 Daoud ................................... 439/676
6,033,259 * 3/2000 Daoud ................................... 439/573

* cited by examiner

Primary Examiner—Paula Bradley
Assistant Examiner—Antoine Ngandjui
(74) Attorney, Agent, or Firm—Stroock & Stroock & Lavan LLP (57) ABSTRACT

A wire connector block is provided formed with an abutment device, a retention device and a contact surface. The combination of these elements enables the wire connector block to be mounted to mounting surfaces of different thicknesses. The abutment device can be either a deflectable spring arm or a tiered rim. The retention device can be either a screw or a deflectable latch, whereas, the contact surface is defined on a portion of the base of the wire connector block.

17 Claims, 7 Drawing Sheets

WIRE CONNECTOR BLOCKS FOR MOUNTING ONTO MOUNTING SURFACES OF VARIABLE THICKNESSES

FIELD OF THE INVENTION

This invention relates to the field of surface mountable wire connector blocks formed for holding a plurality of wire connectors.

BACKGROUND OF INVENTION

Wire connector blocks are known in the prior art which are formed to be mounted to an opening in a mounting surface, such as a panel, to fixedly support a plurality of wire connectors relative to the mounting surface. Prior art wire connector blocks have been formed in the prior art to mount onto a mounting surface of particular thickness. Typically, the wire connector blocks are provided with rigid tabs or a flange to abut against a front face of the mounting surface, and with a latch formed to hook onto a rear face of the mounting surface. Opposite forces are generated by the rigid tabs/flange and the latch, whereby a wire connector block is held on the mounting surface.

As is readily apparent, prior art wire connector blocks are mountable only on panels for which the blocks are sized. Where a great number of wire connector blocks are mounted onto a mounting surface, the mounting surface may begin to deflect under excessive loading. Deflection can be minimized by providing stiffeners which reinforce the mounting surface and impart additional rigidity. Since stiffeners are often mounted in the field, restricted space and other conditions often make the task of mounting stiffeners either impossible or very difficult. To avoid this problem, mounting surfaces have been produced with greater thicknesses which inherently impart the surface with additional rigidity, resulting in a decrease in the likelihood of deflection. However, wire connector blocks sized for mounting on thinner mounting surfaces cannot be mounted onto these thicker mounting surfaces. As a corollary, wire connector blocks sized for thicker mounting surfaces cannot be used on thinner mounting surfaces.

SUMMARY OF THE INVENTION

To overcome shortcomings in the prior art, a wire connector block is provided which is formed to mount onto mounting surfaces (e.g. a panel) of different thicknesses. Specifically, the wire connector block includes a base, a contact surface and an abutment device, which work in combination with a retention device to provide the wire connector block with the ability to mount to mounting surfaces of different thicknesses.

The base is formed with a plurality of sockets, each formed to receive a wire connector. Any type of socket design known in the prior art may be used. Additionally, the contact surface is defined on a boss, or a plurality thereof, and/or a flange formed to extend from the base. In either regard, when mounting the wire connector block of the subject invention, the contact surface is formed and disposed to abut a front face of the mounting surface.

The abutment device is formed as either a deflectable spring arm or as a tiered rim having at least two downwardly-facing, non-coplanar abutment surfaces. In mounting the wire connector block into an opening in a mounting surface, the abutment device is passed through the opening and caused to abuttingly engage a rear face of the mounting surface. As is readily appreciated, the simultaneous abutting of the front face by the contact surface and the abutting of the rear face by the abutment device result in opposite forces being generated that hold the wire connector block rigidly within the opening of the mounting surface.

In addition, the deflectability of the spring arm, and the tiered arrangement of the abutment surfaces of the tiered rim, enable the wire connector block of the subject invention to be mounted to mounting surfaces of different thicknesses. In particular, the spring arm is deflectable in response to mounting surface thickness, wherein, the spring arm deflects more when used with a greater thickness mounting surface. With the tiered rim, the abutment surfaces are spaced apart so as to be used alternatively with different mounting surface thicknesses.

The retention device is either a screw, which is threadedly mounted into a threaded inner passage formed in one of the bosses, or a latch. In either regard, the retention device is used to generate a holding force for the wire connector block which causes the wire connector block to be pressed against the mounting surface. Particularly, in use, the screw is caused to pass through the mounting surface with its head pressing against the rear face of the mounting surface, while the latch has a detent which is caused to come into pressing engagement with the rear face of the mounting surface. As an additional feature, the detent of the latch can be formed with stepped surfaces to allow the detent, and thus the latch, to engage rear faces of various mounting surfaces of different thicknesses.

With the invention disclosed herein, a wire connector block is provided that can be mounted into an opening formed in one of various mounting surfaces having thicknesses falling within a range of thicknesses.

As an additional feature, a cantilevered arm may be provided which extends from the side wall to provide a pressing force against the mounting surface to provide additional stability in holding the connector block in place.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
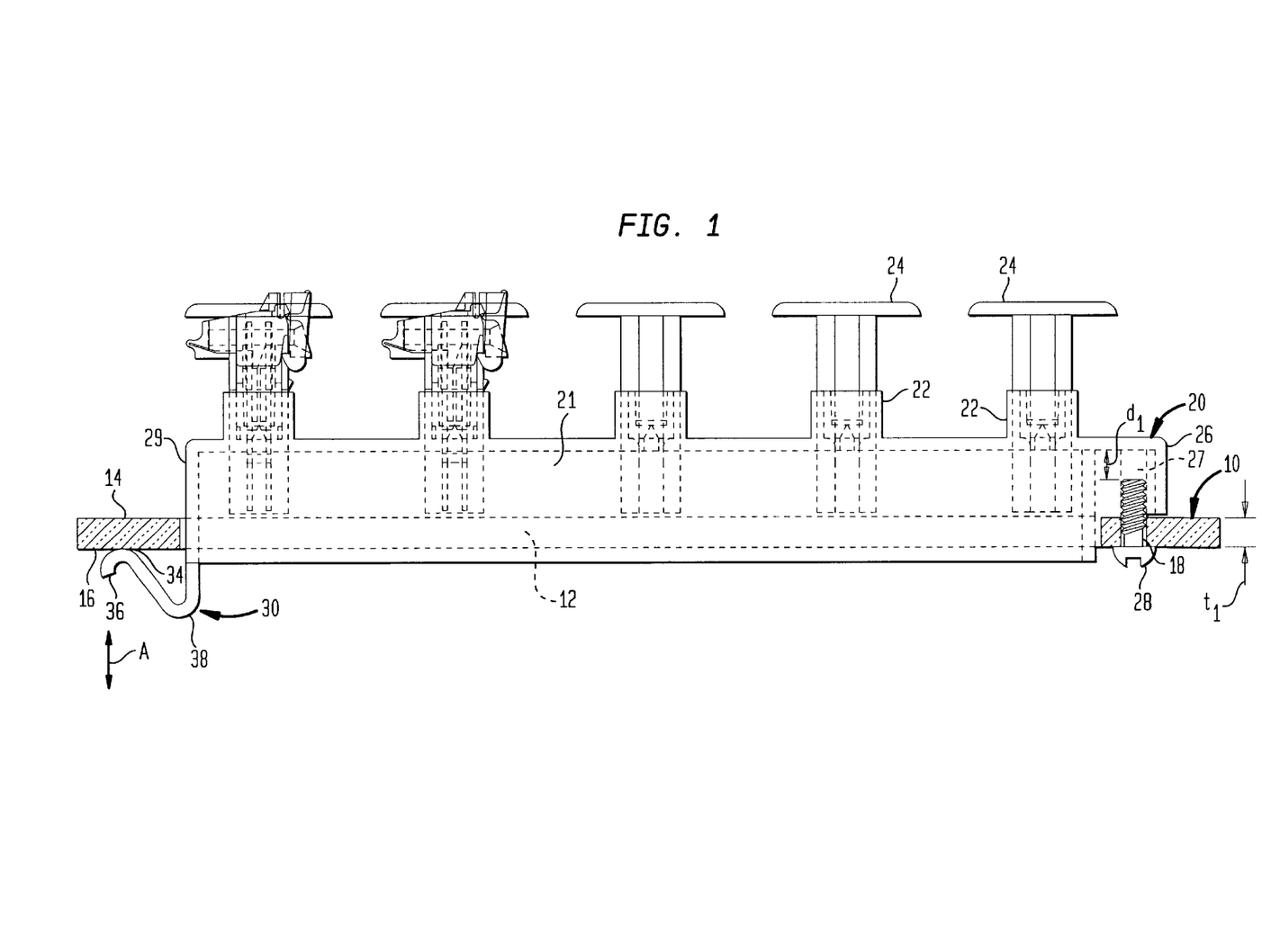
FIG. 1 is a side cross-sectional view of a first embodiment of the wire connector block of the subject invention mounted into an opening formed in a mounting surface.

Referring to FIG. 1, a first embodiment of a wire connector block 20 is shown mounted to an opening 12 in a mounting surface 10, which can be a panel. The mounting surface 10 has opposing faces with a front face 14 and a rear face 16. The front face 14 and the rear face 16 are spaced apart to define a thickness t1 therebetween. Additionally, a fastener aperture 18 is formed through the mounting surface 10 in proximity to the opening 12.

The wire connector block 20 is formed with a base 21 into which a plurality of sockets 22 are formed. The sockets 22 are formed to accommodate and hold wire connectors 24, such as insulation displacement connectors (IDC's). Any type of socket design known to those skilled in the art can be used in conjunction with the subject invention.

In the first embodiment, at least one boss 26 is provided which extends from the base 21. The boss 26 has a threaded inner passage 27 which is located to register with the fastener aperture 18 with the wire connector block 20 being mounted to the mounting surface 10. With this arrangement, a screw 28, which acts as a retention device, can be passed through the rear face 16 of the mounting surface 10 to be threadedly received in the inner passage 27 of the boss 26. The screw 28 provides a retention force which causes the wire connector block 20 to press against the mounting surface 10.

An abutment device 30, which in the first embodiment is a spring arm, also extends from the base 21. The spring arm 30 is formed with an engaging surface 34, an end 36, and an apex 38. Further, the spring arm 30 is resilient and formed to be deflectable to allow for pivoting of the end 36 about the apex 38 such that the engaging surface 34 is movable in a direction generally perpendicular to the rear face 16, the direction being represented by an arrow A. To prevent damage to the mounting surface 10 from the end 36, the end 36 is preferably curved to be directed away from the rear face 16 with the wire connector block 20 being mounted to the mounting surface 10.

Figure 1A:
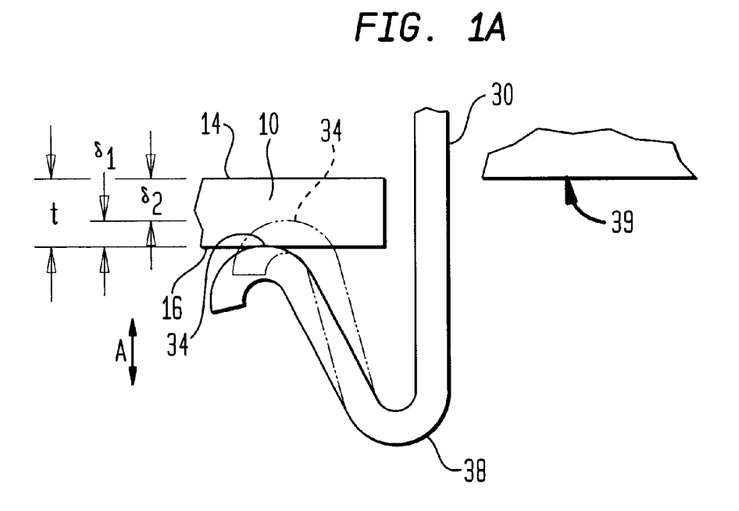
FIG. 1A is an enlarged view showing deflection of the spring arm.

The spring arm 30 is formed such that it must be deflected when the wire connector block 20 is mounted to mounting surface 10. Referring to FIG. 1A, the natural, undeflected state of the spring arm 30 is shown in dashed lines. With the wire mounting block 20 (not fully shown) being mounted to the mounting surface 10, the spring arm 30 is deflected such that the engaging surface 34 is displaced a distance $\delta 1$ in the A direction from its natural position. The deflection of the spring arm 30 results in a spring-generated force being applied by the engaging surface 34 against the rear face 16. To ensure spring force is generated, the engaging surface 34 is located a distance $\delta 2$ from the contact surface(s) 39, described below, with the distance $\delta 2$ being less than the thickness t of the mounting surface 10.

Figure 2:
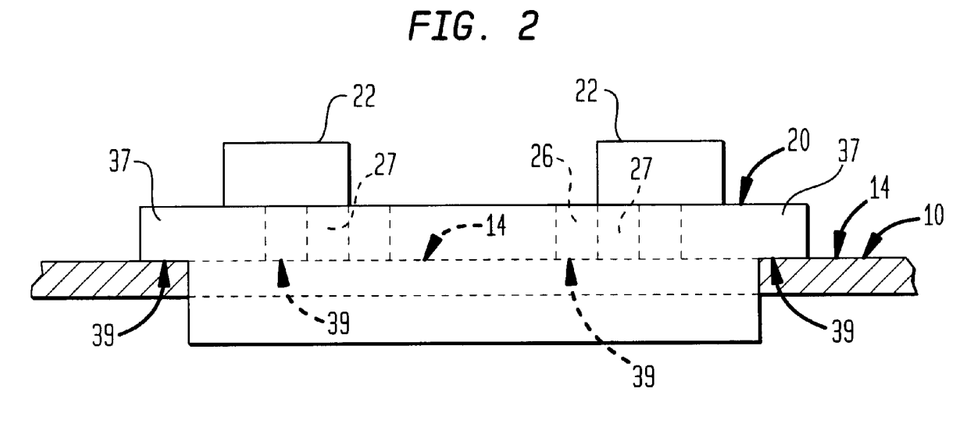
FIG. 2 is an end cross-sectional view of the wire connector block of the subject invention.

The wire connector block 20 is also preferably formed with an outwardly extending flange 37, as shown in FIG. 2, which can be formed continuously along edges of the base 21, or, alternatively, discontinuously. With the boss 26 being provided, the flange 37 is not required for practicing the subject invention. The boss 26 and the flange 37 are each formed with a downwardly facing contact surface 39 positioned to abut the front face 14 of the mounting surface 10, with the wire connector block 20 being mounted thereto. At least one contact surface 39 is required to practice the invention; however, where multiple contact surfaces 39 are provided it is preferred that the surfaces be coplanar.

To mount the wire connector block 20 to the mounting surface 10, the spring arm 30 is passed through the opening 12 and the engaging surface 34 is brought into engagement with the rear face 16. The contact surface 39, formed on the boss 26, and in the preferred embodiment also on the flange 37, is brought into abutting contact with the front face 14 of the mounting surface. Thereafter, a screw 28, acting as a retention device, is caused to be passed through the fastener aperture 18 and into threaded engagement with the inner passage 27 of the boss 26. Opposing forces are generated by the boss 26/flange 37 and the spring arm 30 which act to hold the wire connector block 20 within the opening 12. The screw 28 provides additional retention force for fixedly holding the wire connector block 20 in place.

Figure 3:
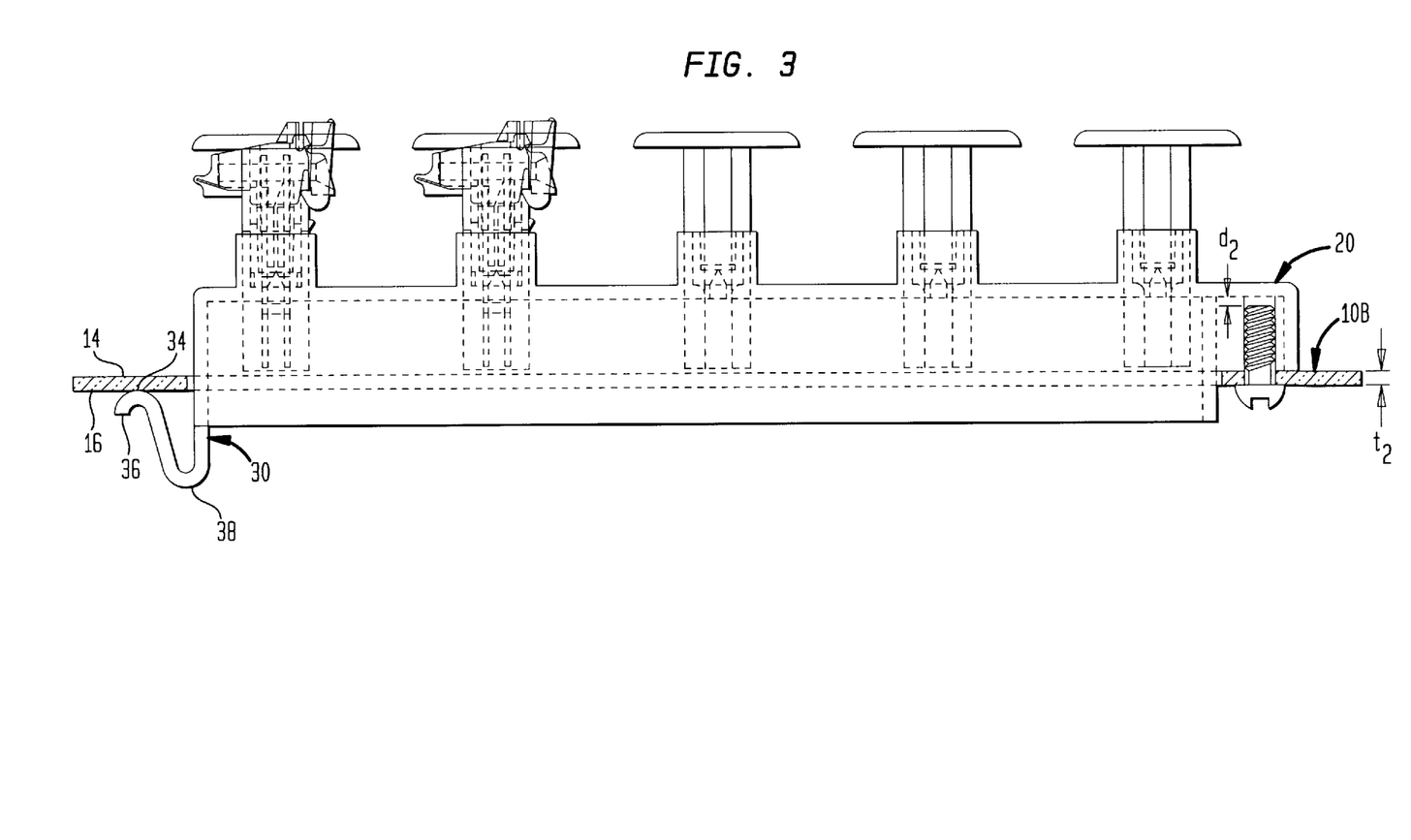
FIG. 3 is a side cross-sectional view of the first embodiment of the invention mounted into an opening formed in a mounting surface that has a thickness less than the thickness of the mounting surface shown in FIG. 1.

Advantageously, the wire connector block 20 can be mounted onto mounting surfaces of different thicknesses. To illustrate this, reference is made to FIG. 3 where the wire connector block 20 is shown to be mounted to mounting surface 10B, which has a thickness t2. The thickness t2 is less than the thickness t1 of the mounting surface 10 shown in FIG. 1. The spring arm 30 is deflected more when used with the mounting surface 10 having the thickness t1 than when used with the mounting surface 10B. Also, a longer screw can be used for mounting the wire connector block 20 to the thicker mounting surface 10, or, if same length screws are used, the screw 28 will be inserted to a lesser depth d1 (FIG. 1) within the boss 26 with a thicker mounting surface 10, than the depth d2 (FIG. 3) with a thinner mounting surface 10B.

Figure 4:
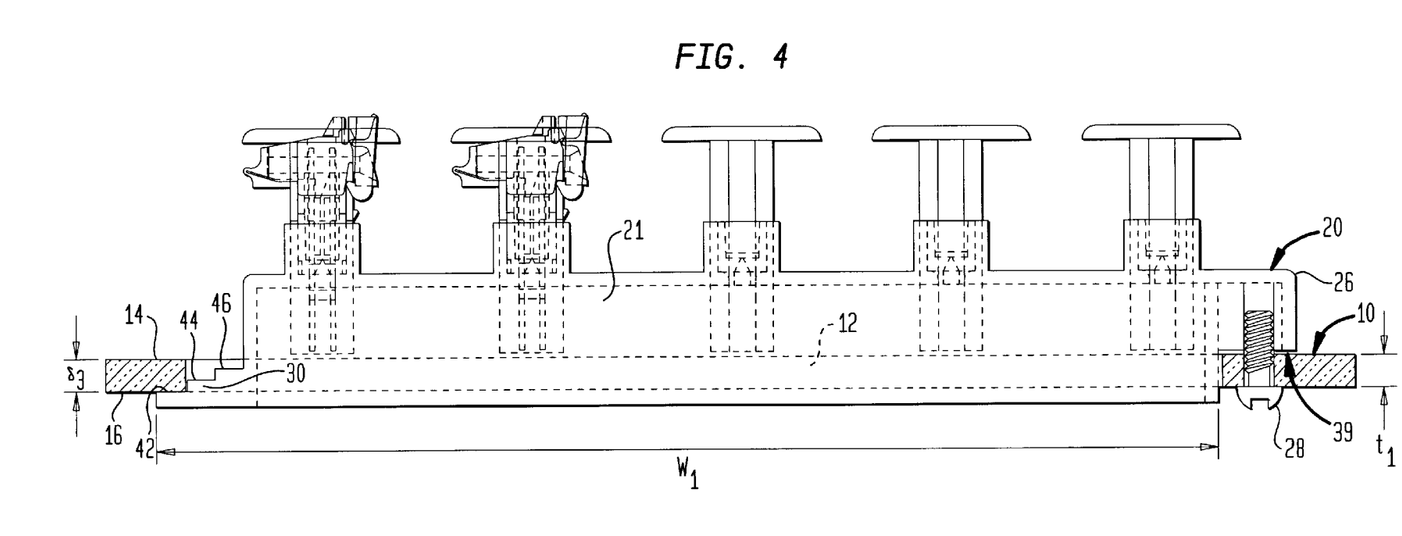
FIG. 4 is a side cross-sectional view of a second embodiment of the wire connector block of the subject invention mounted into an opening formed in a mounting surface.
Figure 5:
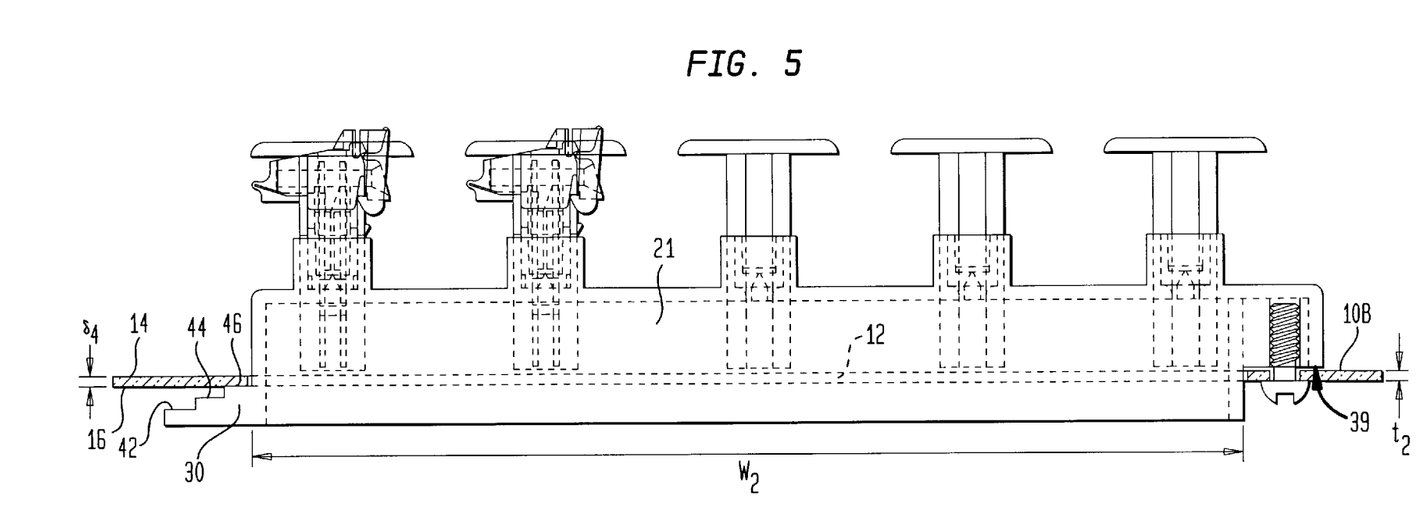
FIG. 5 is a side cross-sectional view of the second embodiment of the invention mounted into an opening formed in a mounting surface that has a thickness less than the thickness of the mounting surface in FIG. 4.

In a second embodiment of the invention, the abutment device 30 is a tiered rim, having downwardly facing parallel, but not coplanar, primary, secondary and tertiary surfaces 42, 44, 46, respectively. The primary, secondary, and tertiary surfaces 42, 44, 46 are preferably flat and selectively usable to abuttingly engage the rear face 16 of the mounting surface 10. The width of the surfaces 42, 44, 46 and the spacing therebetween can be varied to accommodate predetermined mounting surface thicknesses. For example, the primary surface 42 is configured to be used with the mounting surface 10 having the thickness t1 (FIG. 4), whereas, the tertiary surface 46 is configured to be used with the mounting surface 10B having the thickness t2 (FIG. 5). The tiered rim 30 is used in conjunction with the boss 26 and preferably with the flange 37, as described above. To ensure the surfaces 42, 44, 46 are properly located, the respective spacing between the contact surface 39 and the surface 42, 44, 46 intended to be used with a particular mounting surface 10, is nominally equal, and preferably slightly greater than, the thickness of the mounting surface 10. Thus, with respect to FIG. 4, the primary surface 42 is spaced a distance $\delta 3$ from the contact surface 39; the distance $\delta 3$ being nominally equal to, or slightly greater than, the thickness t1. With respect to FIG. 5, the tertiary surface 46 is spaced a distance $\delta 4$ from the contact surface 39; the distance $\delta 4$ being nominally equal to, or slightly greater than, the thickness t2. It is also preferred that the surfaces 42, 44, 46 be parallel to the contact surface(s) 39.

Since the surfaces 42, 44, 46 are stepped, the distances of the surfaces 42, 44, 46 vary from the base 21. Specifically, the primary surface 42 is located at a greater distance from the base 21 than the tertiary surface 46. To enable proper engagement of the rear face 16 by the appropriate surface 42, 44, 46, the width of the opening 12 may need to be varied. For example, in FIG. 4, the opening 12 has a width W1 sized to allow for the primary surface 42 to abut against the rear face 16 simultaneously to the contact surface 39 abutting the front face 14. In FIG. 5, the opening 12 has a width W2 sized to allow for the tertiary surface 46 to abut against the rear face 16 simultaneously to the contact surface 39 abutting the front face 14. The width W1 is greater than the width W2, to compensate for the further extent the primary surface 42 is located from the base 21 as compared to the tertiary surface 46.

The second embodiment of the wire connector block 20 is mounted in similar fashion to the first embodiment, except here one of the surfaces 42, 44, 46 engages the rear face 16 of the mounting surface, rather than the deflectable spring arm. It should be noted that any number of the surfaces can be used with at least two surfaces being minimally provided.

Figure 6:
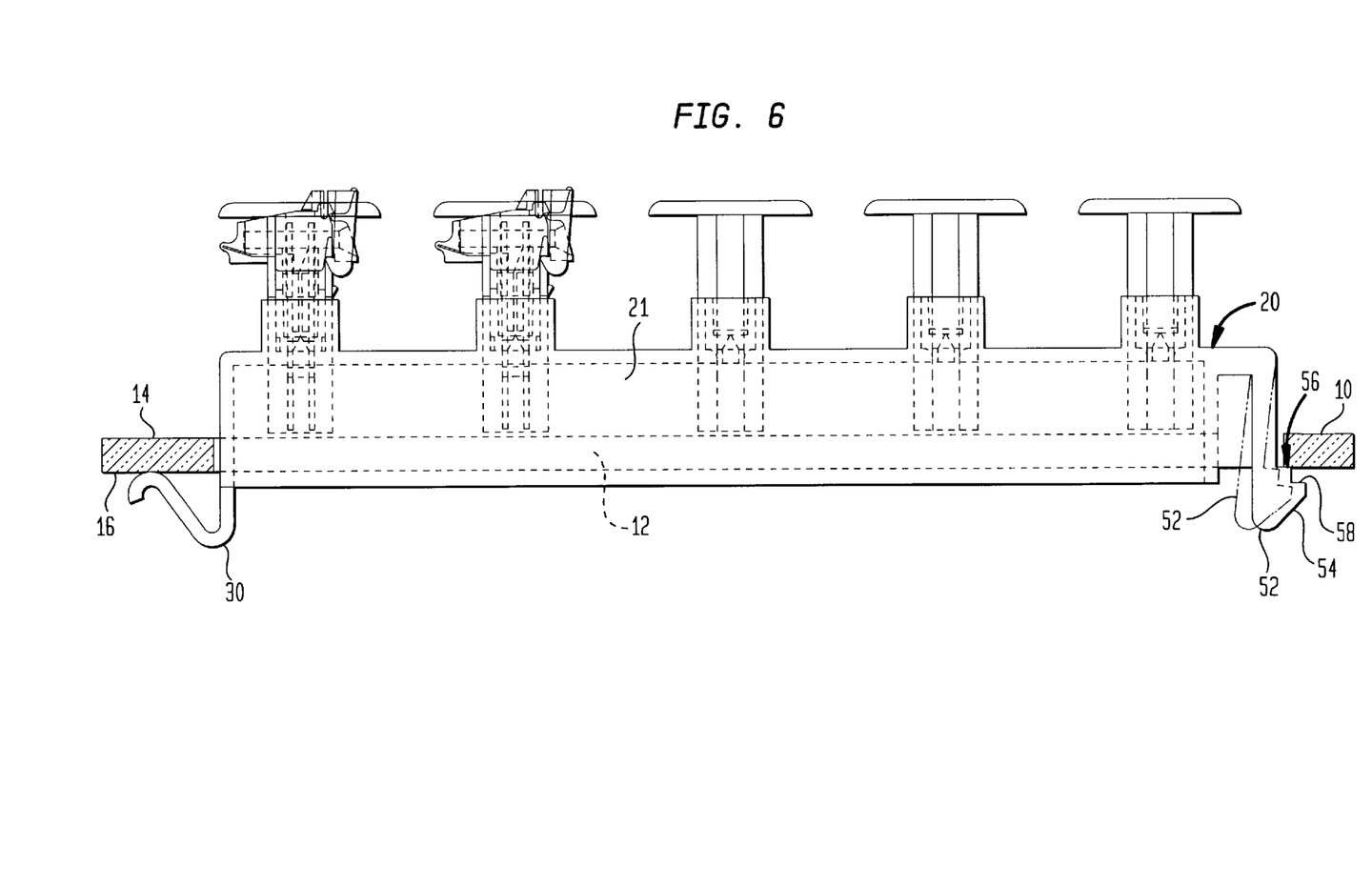
FIG. 6 is a side cross-sectional view of a third embodiment of the invention which utilizes a latch; and, FIG. 7 is a side cross-sectional view of a fourth embodiment of the invention where a cantilevered arm is provided.

FIG. 6 shows a third embodiment of the subject invention which includes an additional retention device, a latch 52 for engaging the rear face 16 of the mounting surface. The latch 52 may be used in lieu of, or in addition to, the boss 26. Also, the latch 52 may be used with either abutment device 30, described above with respect to the first and second embodiments. If the latch 52 is used with the boss 26, then the flange 37 may also be used; however, if the boss 26 is not used, then the flange 37 must be used.

The latch 52 is resilient and deflectable, as shown in dashed lines, to not only allow for passage of the latch through the opening 12, but also to generate a latching force that is transmitted through detent 54 and applied to the rear face 16. Preferably, the detent 54 is formed with stepped surfaces 56, 58 to allow the latch 52 to engage mounting surfaces 10 of different thicknesses. As shown in FIG. 6, the surface 56 engages the rear face 16. The surface 58 is utilizable with mounting surfaces of lesser thickness than the mounting surfaces with which the surface 56 is used. The configuration of the surfaces 56, 58 is arranged in accordance with the disclosure set forth above with respect to the primary, secondary, and tertiary surfaces 42, 44, 46—for example, the surface 58 is located further from the base 21 than the surface 56 and may require a larger opening width than the surface 56.

Figure 7:
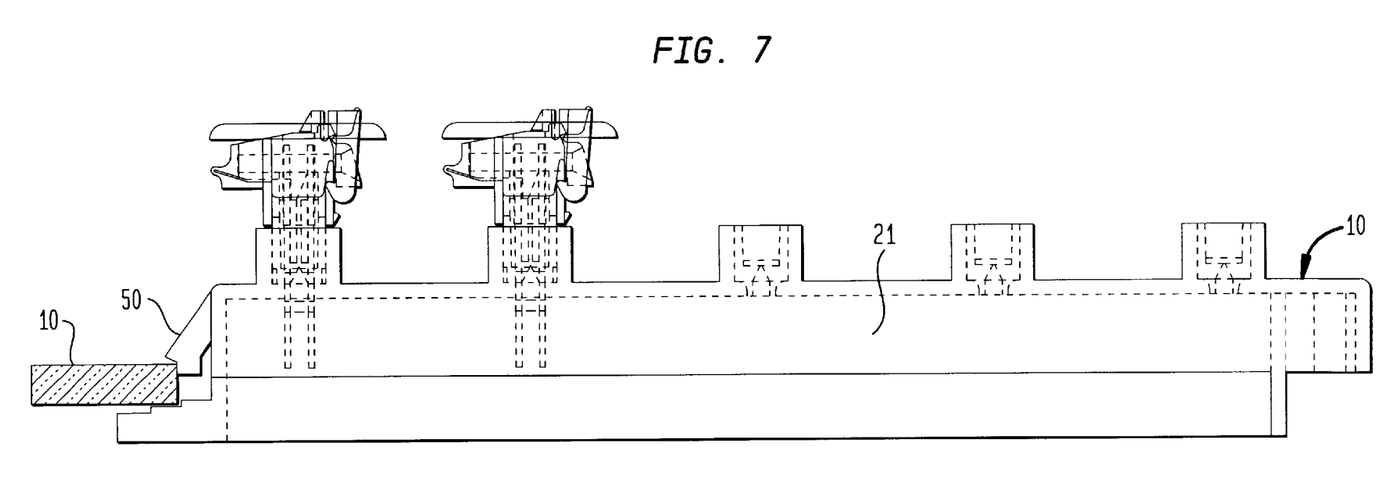

As an additional feature, which can be used in conjunction with any of the embodiments set forth above, a cantilevered arm 50 can be provided to extend from, and be biased in a direction away from, the base 21. As shown in FIG. 7, the cantilevered arm 50 engages and presses against the mounting surface 10 to provide additional stability in supporting the wire connector block 10 when mounted to the mounting surface 10.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A wire connector block for receiving a plurality of wire connectors, said wire connector block being selectively mountable into an opening formed in a mounting surface having a front face and a rear face with a thickness being defined therebetween, said wire connector block comprising:

a substantially flat base for mounting thereon a plurality of wire connectors;

a boss extending from said base, said boss defining a contact surface for contacting a portion of said front face proximate said opening;

an abutment device formed on a side of said base and adapted to be insertable through said opening for abutment with said rear face, said boss and said abutment device being located at opposite ends of said base; and a retention device for retaining said base in a fixed position such that said base is retained in said opening at least in part by the opposing forces of said contact surface abutting against said front face and said retention device abutting against said rear face, said abutment device being so shaped and arranged as to permit abutment with said rear face over a range of thickness of said mounting surface.

2. A wire connector block as in claim 1, wherein said abutment device is a deflectable spring arm extending from said base.

3. A wire connector block as in claim 1, wherein said abutment device is a tiered rim extending from said base, said tiered rim defining at least two flat, non-coplanar, parallel surfaces which face in the same direction.

4. A wire connector block as in claim 1, wherein said retention device is a screw, said boss being formed to threadedly receive said screw.

5. A wire connector block as in claim 1, further comprising a cantilevered arm extending from, and biased away from, said base.

6. A wire connector block as in claim 1 further comprising a flange extending from said base, said flange defining a second contact surface.

7. A wire connector block as in claim 6, wherein said contact surfaces are coplanar.

8. A wire connector block as in claim 1, wherein said retention device is a deflectable latch extending from said base.

9. A wire connector block as in claim 8, wherein said latch includes a detent formed to abuttingly engage said rear face.

10. A wire connector block as in claim 9, wherein said detent has non-coplanar, stepped surfaces which generally face the same direction, said stepped surfaces being disposed to engage said mounting surface.

11. A wire connector block for receiving a plurality of wire connectors, said wire connector block being selectively mountable into an opening formed in a mounting surface having a front face and a rear face with a thickness being defined therebetween, said wire connector block comprising:

a substantially flat base for mounting thereon a plurality of wire connectors;

a flange extending from said base, said flange defining a contact surface for contacting a portion of said front face proximate said opening;

an abutment device formed on a side of said base and adapted to be insertable through said opening for abutment with said rear face, said flange and said abutment device being located at opposite ends of said base; and a retention device for retaining said base in a fixed position such that said base is retained in said opening at least in part by the opposing forces of said contact surface abutting against said front face and said retention device abutting against said rear face, said abutment device being so shaped and arranged as to permit abutment with said rear face over a range of thickness of said mounting surface.

12. A wire connector block as in claim 11, wherein said abutment device is a deflectable spring arm extending from said base.

13. A wire connector block as in claim 11, wherein said abutment device is a tiered rim extending from said base, said tiered rim defining at least two flat, non-coplanar, parallel surfaces which face in the same direction.

14. A wire connector block as in claim 11, further comprising a cantilevered arm extending from, and biased away from, said base.

15. A wire connector block as in claim 11, wherein said retention device is a deflectable latch extending from said base.

16. A wire connector block as in claim 15, wherein said latch includes a detent formed to abuttingly engage said rear face.

17. A wire connector block as in claim 16, wherein said detent has non-coplanar, stepped surfaces which generally face the same direction, said stepped surfaces being disposed to engage said mounting surface.

* * * * *